(Model.)
E. EVANS.
PATTERN FOR MOLDING STOVE LIDS.
No. 337,052. Patented Mar. 2, 1886.
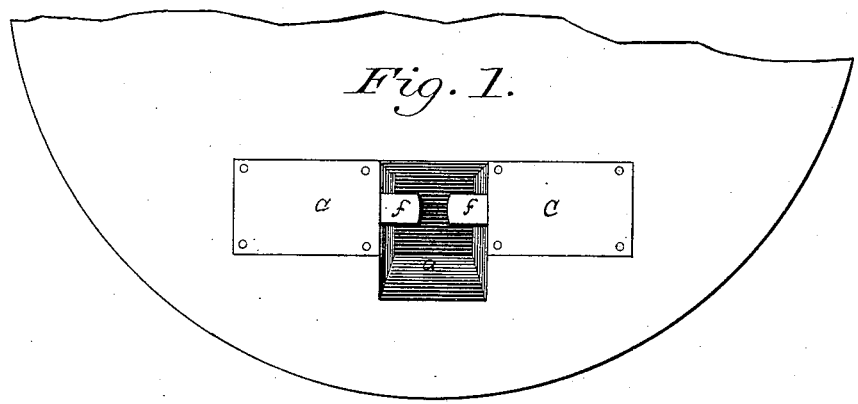
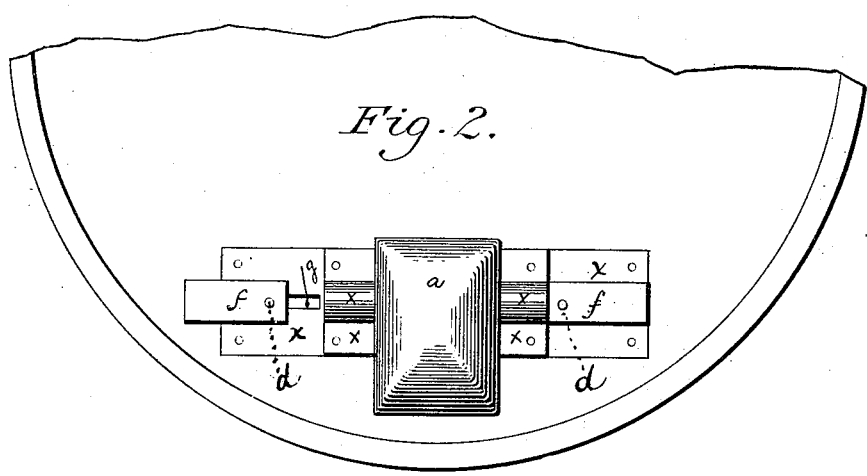
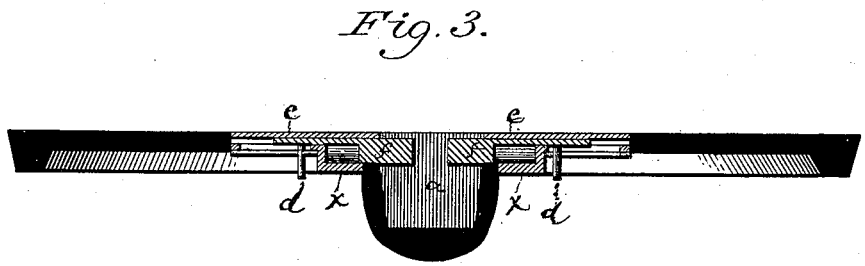
Witnesses:
J. W. Corrill Jr.
S. W. Battell
Inventor:
Edward Evans

UNITED STATES PATENT OFFICE.

EDWARD EVANS, OF QUINCY, ILLINOIS, ASSIGNOR OF ONE-HALF TO JOHN H. WHITBREAD, OF SAME PLACE.

PATTERN FOR MOLDING STOVE-LIDS.

SPECIFICATION forming part of Letters Patent No. 337,052, dated March 2, 1886.

Application filed April 20, 1885. Serial No. 162,991. (Model.)

*To all whom it may concern:*

Be it known that I, EDWARD EVANS, of the city of Quincy, in the county of Adams and State of Illinois, have invented a Pattern, or an Improvement in the Old-Style Pattern, for the Molding of Stove-Lids, of which the following is a specification.

With my improvement stove-lids can be molded much faster, easier, and better than in the old way.

Figure 1 is a top view of the pattern, showing the ends of the slides in the core-cavity and the plates protecting the slides. Fig. 2 shows the under side view of the pattern with the slides and the protection-plates. Fig. 3 is a vertical section of the pattern with the slides and their protection-plates.

$a$ in Figs. 1, 2, and 3 is the core-cavity.

$c$ in Figs. 1, 2, and 3 are the plates protecting the slides on the upper side of the pattern.

$f$ in Figs. 1, 2, and 3 are the movable slides that form the catches in the core-seat for the stove-hook to catch under.

$d$ in Figs. 2 and 3 are the handles for moving the slides.

$x$ in Figs. 2 and 3 are the protecting-plates covering the slides on the under side of the pattern and covering the space which the slides occupy when drawn out of the core-seat.

By using my improvement when molding or making the molds for the lids, the cast projections can be made at the same time with the balance of the lid, and they will be of a uniform size and standing in the same relative direction with the lids.

In using this improvement the slides are pushed in toward each other and into the core-seat. Then the sand is packed on the upper side first, and when finished is turned over and the under side of the flask filled. Then, before taking out the pattern, after having removed the sand from the under side of the lid, the slides are to be pushed outward until the core-seat of the pattern is entirely empty excepting of sand and there is nothing to prevent the pattern from being raised up. When the mold is finished, the sand is packed as tightly in one place as another, thereby preventing the hot metal from blowing off the core-seat.

The slides and their protections can be made of any kind of metal or of wood.

What I claim as my invention, and desire to secure by Letters Patent, is—

The combination, with a pattern, of the slides $f$, having the pins $d$, and the plates $c$ and $x$, the plates $x$ having the slots $g$, substantially as described, and for the purpose set forth.

EDWARD EVANS.

Witnesses:
J. W. CORRILL, Jr.,
S. W. BATTELL.